United States Patent [11] 3,572,849

| [72] | Inventor | Thomas H. Engle |
| | | Cape Vincent, N.Y. |
| [21] | Appl. No. | 847,054 |
| [22] | Filed | Aug. 4, 1969 |
| [45] | Patented | Mar. 30, 1971 |
| [73] | Assignee | General Signal Corporation |

[54] BRAKE PIPE PRESSURE CONTROL SYSTEM
11 Claims, 6 Drawing Figs.

[52] U.S. Cl. .................................................. 303/25,
303/3, 303/66
[51] Int. Cl. .................................................. B60t 13/62
[50] Field of Search .......................................... 137/81.5;
243/3, 7—11, 14, 16—17, 36; 303/3, 20, 28, 25,
13, 30, 66; 105/61

[56]  References Cited
UNITED STATES PATENTS

| 1,949,033 | 2/1934 | Wright | 303/20 |
| 1,972,747 | 9/1934 | Miller et al. | 303/20 |
| 2,004,655 | 6/1935 | Farmer et al. | 303/20 |
| 2,096,491 | 10/1937 | Hewitt | 303/28 |
| 3,118,707 | 1/1964 | Simmons et al. | 303/22 |
| 3,260,553 | 7/1966 | Jeffrey | 303/16 |
| 3,490,814 | 1/1970 | Smith et al. | 303/20 |

*Primary Examiner*—Milton Buchler
*Assistant Examiner*—Stephen G. Kunin
*Attorney*—Dodge & Ostmann ABSTRACT: Apparatus for controlling the pressure in the brake pipe of an air brake system. The apparatus includes, as operative elements, a brake pipe pressure reduction controller, equalizing reservoir charging and discharge valves, and brake pipe cutout and vent valves, and the components are adapted to be controlled by low power digital or on-off signals. The control signals are furnished by a control mechanism, such as a fluidic logic circuit, which may include one or more controlling stations located either locally or remotely and operated either automatically or manually.

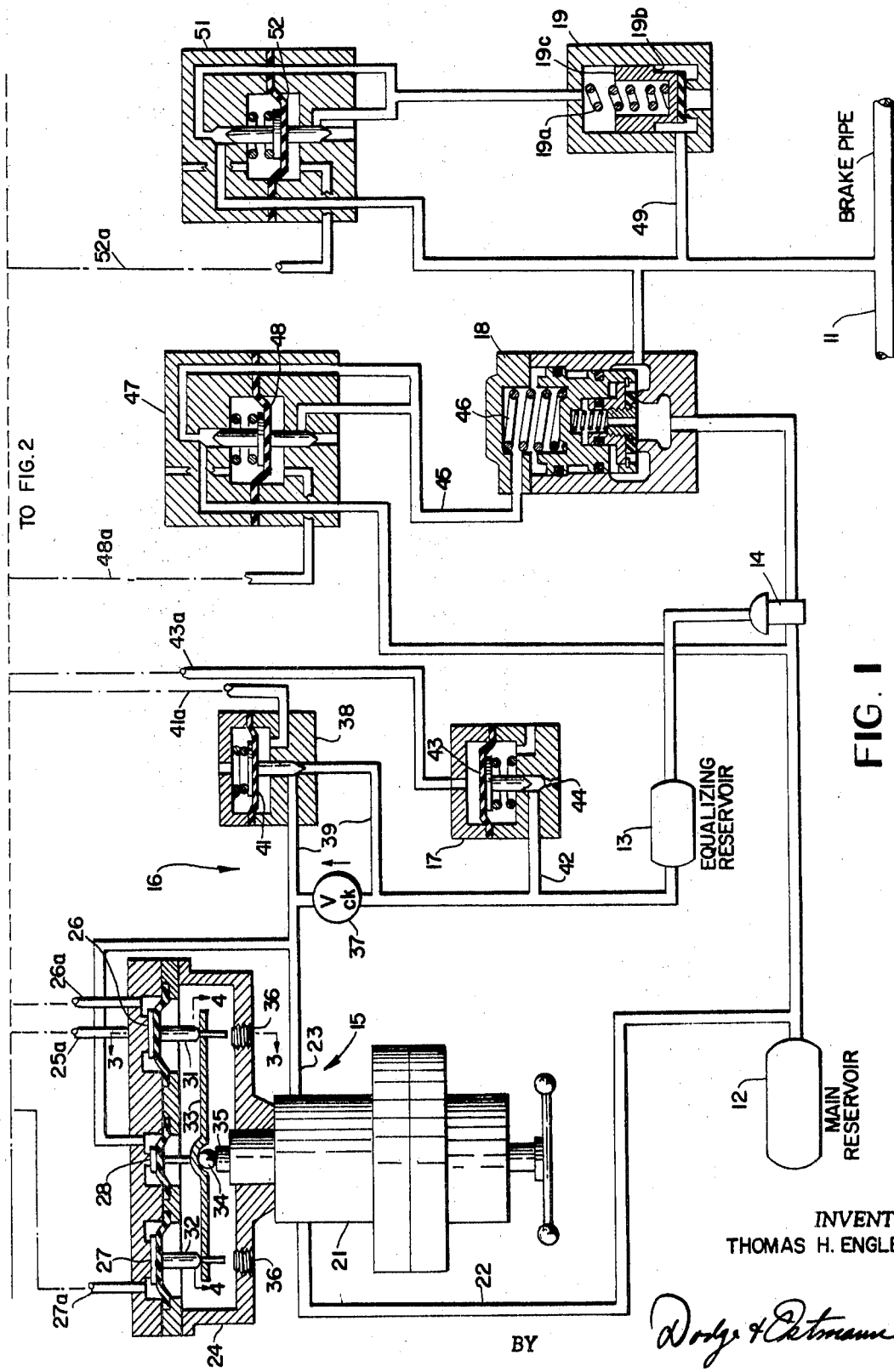
FIG. I
INVENTOR
THOMAS H. ENGLE

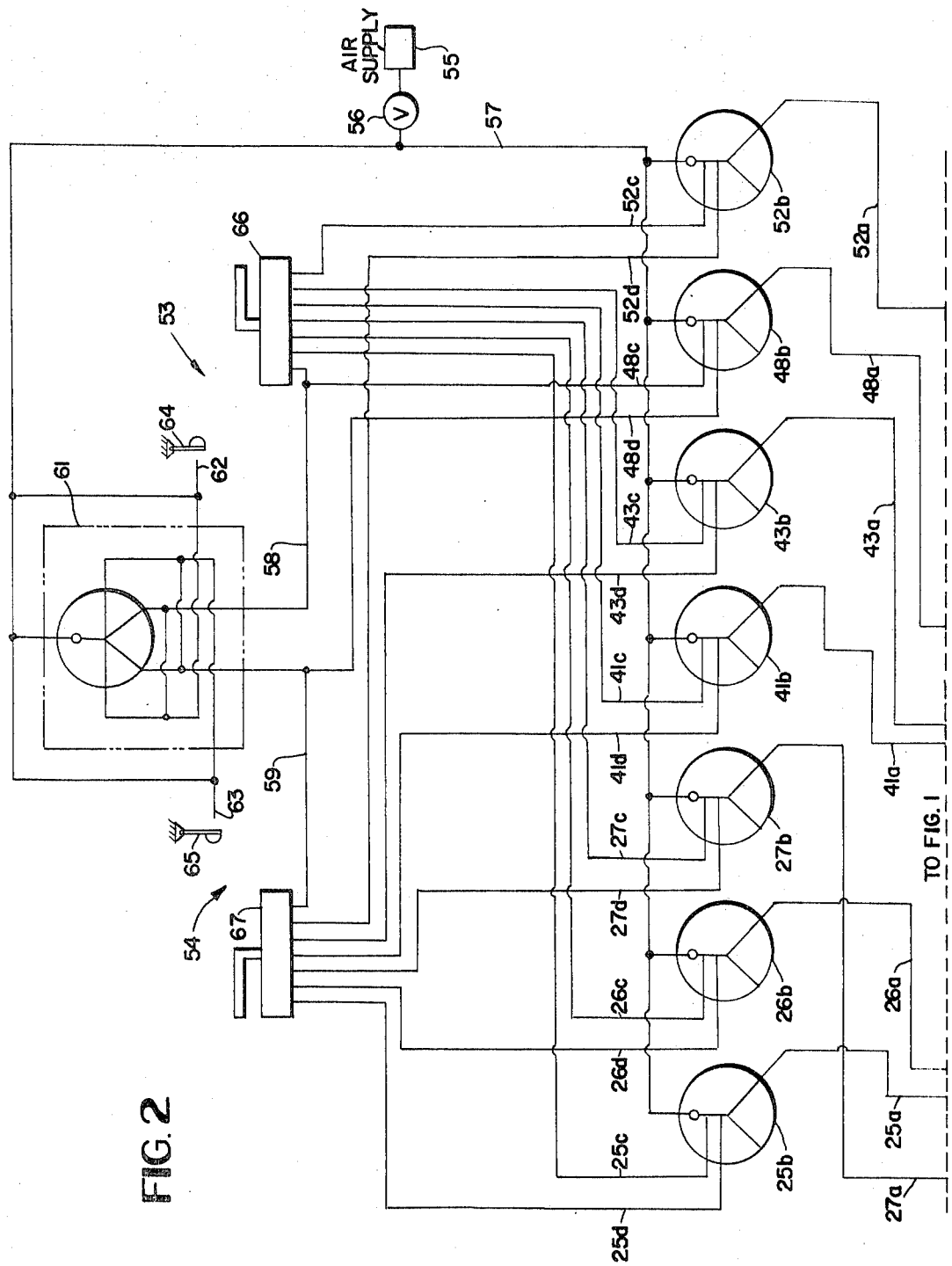

PATENTED MAR 30 1971

INVENTOR
THOMAS H. ENGLE

BY Dodge & Eastman

ATTORNEYS 3,572,849

BRAKE PIPE PRESSURE CONTROL SYSTEM

BACKGROUND AND SUMMARY OF THE INVENTION

At the present time, the pressure in the brake pipe of a railway train usually is controlled by a brake valve, such as the type 26–C Brake Valve, carried on the locomotive. The brake valve is operated by a rotatable handle which, in addition to a range of service positions through which it can be moved to effect a progressive decrease in brake pipe pressure, has discrete release, minimum reduction, suppression, handle-off and emergency positions. The force required to shift the handle and the relatively large number of handle positions present no real problem for a human operator who is stationed near the valve so that he can directly manipulate the handle. However, the combined effect of these two factors does make it impractical to operate the valve from a remote location or from the output of an automatic control system. Thus, it is evident that this type of brake pipe pressure control device is not suitable for use in the more refined train control schemes being proposed for the future.

The object of this invention is to provide a brake pipe pressure control system which can perform the basic functions of the standard brake valve and be operated either by an automatic control system or by a human operator located at a remote station. According to the invention, the system is divided into an operative section containing the components which directly influence brake pipe pressure, and a control section that performs logic functions and produces control signals. The operative components are a reduction controller, equalizing reservoir charging and discharge valves, and brake pipe cutout and vent valves, and each of these five devices is interfaced with the control section in such manner that it can be actuated by low power, digital or on-off signals. Since the output of the control section is in the form of a digital, in contrast to an analogue command and is of low power, electronic or fluidic logic circuits can be employed. This makes practical remote or automatic control of brake pipe pressure.

BRIEF DESCRIPTION OF THE DRAWINGS

The preferred embodiment of the invention is described herein with reference to the accompanying drawings in which:

FIG. 1 is a schematic diagram of the operative section of the new system.

FIG. 2 is a schematic diagram of a representative control section which can be used with the FIG. 1 embodiment.

DETAILED DESCRIPTION OF THE PREFERRED EMBODIMENT

Figure 4:
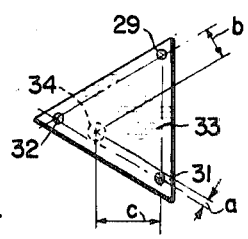
FIG. 4 is a sectional view, on reduced scale, taken on line 4–4 of FIG. 1.

As shown in FIG. 1, the operative section of the system is arranged to control the pressure in a trainlined brake pipe 11 and, in addition to a conventional main reservoir 12, equalizing reservoir 13 and relay valve 14, includes a reduction controller 15, an equalizing reservoir charging valve means 16, an equalizing reservoir discharge valve 17, and cutout and vent valves 18 and 19, respectively, for the brake pipe. Reduction controller 15 consists of a standard regulating valve 21 of the type used in the Type 26–C Brake Valve and which is provided with an inlet connection 22 leading from main reservoir 12 and an outlet connection 23 leading to equalizing reservoir 13, and an interfacing device 24 including three actuating motors 25—27 and a balancing motor 28. The pistons 29, 31 and 32 of the actuating motors bear against the corners of a triangular plate 33 which is supported for pivotal movement by a ball 34 carried on the end of the input plunger 35 of regulating valve 21. The strokes of pistons 29, 31 and 32, which are determined by the settings of threaded stops 36, are substantially equal, but the actuating motors displace plunger 35 different distances, and thus raise the output pressure of valve 21 different amounts, because plate 33 pivots about a point eccentric to its geometric center. Preferably, the eccentricity is such that, as shown in FIG. 4, the perpendicular distances $a$, $b$ and $c$ from the pivot to the centerlines of the actuator motor bearing points are in the ratio of 1: 2: 4. With this arrangement, the effect on regulator output pressure of motor 27 is twice that of motor 26 and four times that of motor 25. In a typical case, the strokes of motors 25, 26 and 27 are set so that these motors add 3½ 7and 14 p.s.i., respectively, to the basic setting of the regulator. The effects of motors 25—27 on valve 21 are cumulative and, therefore, as various combinations of these motors are pressurized or charged, the output pressure of valve 21 will increase to a maximum in steps of 3½p.s.i. Conversely, venting of the actuating motors in a programmed manner effects a stepped reduction in output pressure. The following table summarizes the reduction schedule for controller 15:

| Reduction in regulator output pressure (p.s.i.) | States of actuating motors | | |
|---|---|---|---|
| | Motor 25 | Motor 26 | Motor 27 |
| 0 | Charged | Charged | Charged. |
| 3½ | Vented | do | Do. |
| 7 | Charged | Vented | Do. |
| 10½ | Vented | do | Do. |
| 14 | Charged | Charged | Vented. |
| 17½ | Vented | do | Do. |
| 21 | Charged | Vented | Do. |
| 24½ | Vented | do | Do. |

It should be noted here that the desired effect of motors 25—27 can also be produced by pivoting plate 33 at its geometric center and giving the motors unequal strokes selected to produce the required displacements of input plunger 35. However, this scheme is considered inferior to the one which is illustrated because it causes the actuating motors to impose unequal flow demands on the fluidic supply circuit in the control section.

The internal construction of regulating valve 21 is such that input plunger 35 is subjected to an upward directed force proportional to the output pressure. This force could have an adverse effect upon the interface device 24 were it not for the fact that it is partially counteracted by balancing motor 28.

The equalizing reservoir charging valve means 16 comprises a standard check valve 37 interposed in outlet connection 23 and oriented as shown, and a charging valve 38 which controls flow through bypass 39 around the check valve. Valve 38 is biased closed by a spring and is opened by a diaphragm actuating motor 41 which is charged and vented by the fluidic control section of the system. The arrangement is such that controller 15 always is permitted to reduce the pressure in equalizing reservoir 13, but can charge the reservoir only when actuating motor 41 is charged.

The equalizing reservoir discharge valve 17 is a simple two-way interface valve which controls a vent connection 42 leading from reservoir 13 to the atmosphere. The valve is biased open by a spring and is closed by a diaphragm actuating motor 43 which is controlled by the fluidic circuit. Therefore, valve 17 will permit charging of reservoir 13 only when the control section supplies a pressure signal to motor 43. Connection 42 contains a choke 44 in order to insure that reduction in equalizing reservoir pressure effected by valve 17 will be made at a service rate.

The brake pipe cutout valve 18 employed in the FIG. 1 embodiment is identical to the brake pipe cutoff valve used in the Type of 26–C Brake Valve. In this case, however, the connection 45 leading to the pilot chamber 46 behind the valve is alternately connected with main reservoir 12 or the atmosphere by a three-way or selector type interface valve 47. This valve 47 is biased to the illustrated pressurizing position by a spring and is shifted to the vent position by a diaphragm actuating motor 48 which, as in the case of the other actuating motors, is controlled by the fluidic circuit. Thus, in the absence of a fluidic pressure signal, cutout valve 18 will isolate brake pipe 11 from relay valve 14 and thereby preclude the apparatus from changing brake pipe pressure.

The final component of the operative section of the system is the vent valve 19 which serves to open and close a large capacity connection 49 leading from brake pipe 11 to the atmosphere. This valve, which may take the form of a Type E-3 Brake Application Valve, is biased closed by a spring 19a and is opened by a pair of opposed air motors 19b and 19c. Motor 19b is in constant communication with brake pipe 11 and is arranged to shift valve open, whereas motor 19c is alternately connected with the brake pipe or the atmosphere by a selector valve 51 which is identical to valve 47 and also is controlled by the fluidic control section of the system. When valve 51 is in the illustrated position, both of the motors 19b and 19c are subjected to brake pipe pressure, and consequently valve 19 is held closed. On the other hand, when the actuating motor 52 is pressurized to shift valve 51 to vent position, motor 19c is vented and motor 19b opens valve 19. This, of course, effects rapid venting of the brake pipe.

The seven actuating motors 25—27, 41, 43, 48 and 52 associated with the operative elements are vented and charged through signal pipes 25a, 26a, 27a, 41a, 43a, 48a and 52a, respectively, leading from the control section of the system. This section can take various forms, but the one chosen for illustration employs fluidic circuitry and allows brake pipe pressure to be controlled from either of two stations. Referring to FIG. 2, the control section includes seven conventional fluidic OR gates 25b, 26b, 27b, 41b, 43b, 48b, and 52b, one of which is associated with each signal pipe and each of which is connected to a pair of control pipes 25c, 25d; 26c, 26d; 27c, 27d; 41c, 41d; 43c, 43d; 48c, 48d and 52c, 52d leading, respectively, to the two control stations 53 and 54. The gates are supplied with low pressure air from a source 55 through a master shutoff valve 56 and a supply pipe 57, and each gate serves to pressurize the attached signal pipe as long as air is delivered to it through one or the other of its control pipes. When air flow to both control pipes is interrupted, the OR gate vents the associated signal pipe.

Control stations 53 and 54 receive air from pipe 57 through supply connections 58 and 59, respectively, and a fluidic switch or flip-flop 61. Flip-flop 61 has a pair of control passages 62 and 63 which normally communicate with the atmosphere, but which can be closed by pushbutton valves 64 and 65, respectively, located at the control stations 53 and 54. Momentary closure of one of the valves 64 and 65 causes flip-flop 61 to deliver air under pressure to the supply connection 58 or 59 leading to the station at which the valve is located and to reduce the pressure in the other supply connection. And, as long as valve 56 remains open and air is being delivered to the flip-flop, its condition will not change until the other valve 64 or 65 is momentarily closed.

Figure 5:
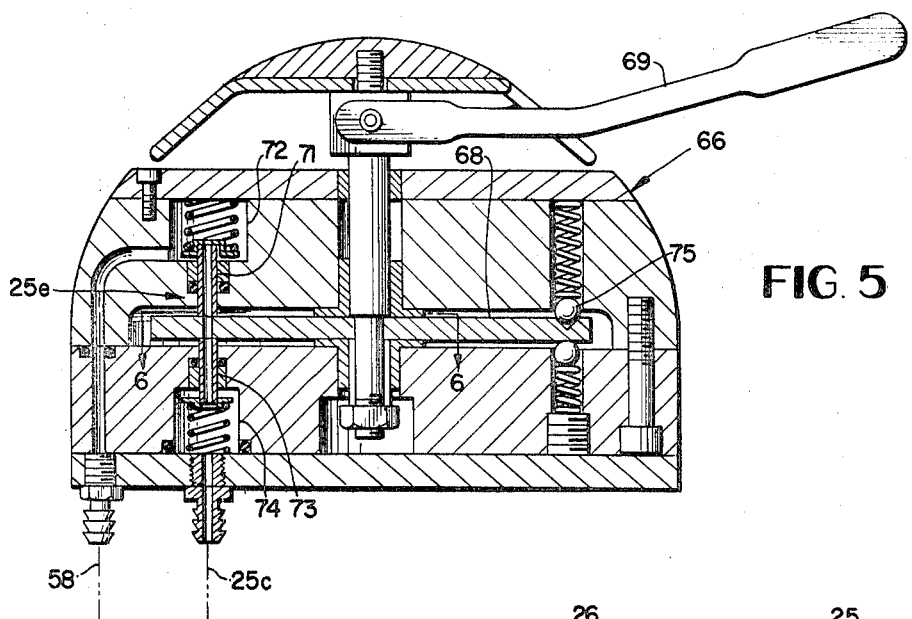
FIG. 5 is a sectional view of the fluidic brake valve shown schematically in FIG. 2.
Figure 3:
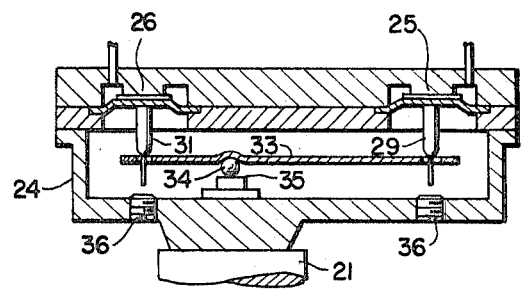
FIG. 3 is a sectional view taken on line 3–3 of FIG. 1.
Figure 6:
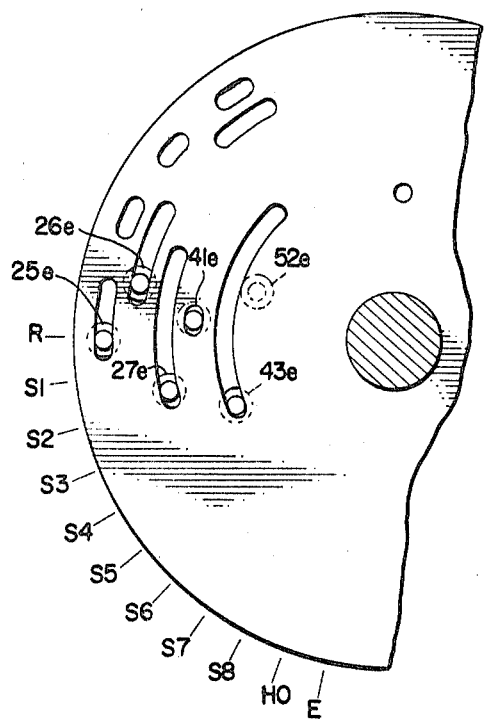
FIG. 6 is a sectional view, on enlarged scale, taken on line 6–6 of FIG. 5.

In addition to the pushbutton valve 64 or 65, each control station also includes a fluidic brake valve 66 or 67. The brake valve receives air through connection 58 or 59 and serves to direct it selectively to one set of the control pipes of the OR gates 25b, 26b, 27b, 41b, 43b, and 52b. The control pipes 48c and 48d of the remaining gate 48b are directly connected to supply connections 58 and 59, respectively, so this gate always is on, and the signal pipe 48a it controls always is pressurized, when master valve 56 is open. Fluidic brake valve 66 includes a flat disc 68 mounted for rotation by a handle 69, and formed with six radially spaced sets of through ports. Each set of ports cooperates with a pair of opposed, tubular valve seats which bear against the upper and lower faces of disc 68 and define therewith a control valve for selectively connecting one of the control pipes 25c, 26c, 27c, 41c, 43c and 52c with supply connection 58. The control valve 25e for pipe 25c is shown in FIG. 5, and the other valve 26e, 27e, 41e, 43e and 52e are indicated in FIG. 6. It will be understood that the upper tubular seats 71 of all six valves are disposed in a common manifold 72 which communicates with supply connection 58, and that the lower seats 73 are received in separate outlet chambers 74. The disc 68 has eleven positions defined by a yielding detent 75 and arranged as shown in FIG. 6. The conditions of the six control valves in these positions are listed in the following table:

| Position | Control valve | | | | | |
|---|---|---|---|---|---|---|
| | 25e | 26e | 27e | 41e | 43e | 52e |
| Release (R) | Open | Open | Open | Open | Open | Shut. |
| Minimum service (S1) | do | do | do | Shut | do | Do. |
| Partial service: | | | | | | |
| (S2) | Shut | do | do | do | do | Do. |
| (S3) | Open | Shut | do | do | do | Do. |
| (S4) | Shut | do | do | do | do | Do. |
| (S5) | Open | Open | Shut | do | do | Do. |
| (S6) | Shut | do | do | do | do | Do. |
| (S7) | Open | Shut | do | do | do | Do. |
| Full service (S8) | Shut | do | do | do | do | Do. |
| Handle off (HO) | do | do | do | do | Shut | Do. |
| Emergency (E) | do | do | do | do | do | Open. |

Fluidic brake valve 67 is identical to valve 66 and is arranged to selectively pressurize the control pipes 25d, 26d, 27d, 41d, 43d and 52d.

When the system is in operation and master shutoff valve 56 is closed, the signal pipes 25a, 26a, 27a, 41a, 43a, 48a and 52a will be vented through their associated OR gates, and the operative elements of FIG. 1 will assume their illustrated positions. Therefore, equalizing reservoir 13 will be drained through discharge valve 17, brake pipe 11 will be cutout by valve 18, and vent valve 19 will be held closed. In order to activate the system and commence controlling from station 53, valve 56 is opened and valve 64 is closed momentarily. This causes flip-flop 61 to deliver air under pressure to supply connection 58 and to exhaust supply connection 59. As a result, station 54 maintains control pipes 25d, 26d, 27d, 41d, 43d, 48d and 52d vented, and station 53 immediately pressurizes control pipe 48c to turn on OR gate 48b and enable it to pressurize signal pipe 48a and charge actuating motor 48. The actuating motor now shifts selector valve 47 to vent position and thereby conditions cutout valve 18 to allow communication between relay valve 14 and brake pipe 11. If valve 66 is in Handle Off position, control pipes 25c, 26c, 27c, 41c, 43c and 52c will be vented; hence, the other OR gates will stay off, and the operative elements 15, 16, 17 and 19 will remain in their illustrated positions. Since, at this time, reservoir 13 is vented, the air in brake pipe 11 will escape to atmosphere through cutout valve 18 and the exhaust valve in relay valve 14.

Movement of handle 69 to Full Service position S8 opens control valve 43e and causes it to admit air under pressure to control pipe 43c and turn on OR gate 43b Now, actuating motor 43 is charged through signal pipe 43a, so the equalizing reservoir discharge valve 17 is closed to break the connection between the reservoir and atmosphere. As the handle is rotated through the Partial Service positions S7 to S1, valves 25e, 26e and 27e are opened according to the schedule presented above, and OR gates 25b, 26b and 27b charge the actuating motors 25, 26 and 27 in a manner that raises the output pressure of controller 15 in 3½ p.s.i. steps. Thus, in Minimum Service position S1, the output pressure will be 24½ p.s.i. higher than in the Full Service position S8. This action, however, has no effect upon equalizing reservoir pressure because OR gate 41b has been turned off, and charging valve 38 has remained closed. When the handle 69 is finally shifted to Release position R, brake valve 66 turns on all of the OR gates except gate 52b, so valve 38 opens and charges equalizing reservoir 13 to the level of the maximum output pressure of controller 15. As equalizing reservoir pressure rises, the supply valve in relay valve 14 opens to permit charging of brake pipe 11 to a corresponding level.

If handle 69 is now moved back to Minimum Service position S1, OR gates 25b and 41b are turned off, and actuating motors 25 and 41 are vented. As a result, the output pressure of controller is reduced 3½ p.s.i., and charging valve 38 is closed. Since check valve 37 permits flow from equalizing reservoir 13 to controller 15, reservoir pressure decreases with the output pressure of the controller. This change in reservoir pressure is sensed by relay valve 14 which, in turn, bleeds air from brake pipe 11 and thereby effects a corresponding reduction in its pressure. As movement of handle 69 continues, the pressures in equalizing reservoir 13 and brake pipe 11 decrease in 3½p.s.i. steps until, in Full Service position S8, the maximum service reduction of 24½p.s.i. has been achieved.

If handle 69 is returned to Handle Off position, OR gate 43b will be turned off, discharge valve 17 will open to drain equalizing reservoir 13, and brake pipe pressure will decrease to zero at a service rate. On the other hand, if a handle 69 is moved through Handle Off position to Emergency position E, fluidic brake valve 66 will not only turn off gates 25b, 26b, 27b, 41b and 43b, but will turn on OR gate 52b. Now, selector valve 51 vents motor 19c to thereby permit vent valve 19 to open and dissipate brake pipe pressure at an emergency rate.

In order to switch control of the operative elements of FIG. 1 to station 54, it is necessary only to momentarily close valve 65. This action causes flip-flop 61 to direct air to supply connection 59 and to vent connection 58, and thus puts OR gates 25b, 26b, 27b, 41b, 43b, 48b and 52b under the exclusive control of station 54. The change in command will not affect the state of OR gate 48b since it is turned on whenever either of the connections 58 and 59 is pressurized, and it will have no effect on the other gates provided the handles of the fluidic brake valves 66 and 67 are in the same position.

The system is completely deactivated by simply closing master shutoff valve 56 to interrupt the supply of air to the control stations and the OR gates. When this is done, the operative components of FIG. 1 assume their illustrated positions, so equalizing reservoir 13 is drained, and brake pipe cutout valve 18 is closed to prevent the system from either increasing or decreasing brake pipe pressure. Thus, if the train includes another brake pipe pressure controlling apparatus it may now be used without any adverse effect from the illustrated system.

I claim:

1. In apparatus for controlling the air pressure in a brake pipe and which includes an adjustable regulating valve supplied from a main reservoir and adapted to maintain selected pressure levels in an equalizing reservoir, a relay valve responsive to equalizing reservoir pressure and adapted to maintain a corresponding pressure in the brake pipe, a cutout valve interposed in a connection between the relay valve and the brake pipe and controlled by a piloted motor, and a vent valve adapted to open and close a large capacity connection between the brake pipe and the atmosphere, the improvement which comprises:
   a. a plurality of actuating motors (25, 26, 27) arranged to adjust the setting of the regulating valve (21) and each being effective to increase the output pressure of that valve a prescribed amount, the effects of the motors on the setting of the valve being cumulative;
   b. charging valve means (16) comprising a check valve (37) interposed in the connection (23) between the regulating valve (21) and the equalized reservoir (13) an oriented to block flow toward the reservoir, and a bypass (39) around the check valve controlled by a normally closed charging valve (38) which is opened by an actuating motor (41);
   c. a normally open discharge valve (17) controlling an atmospheric vent connection (42, 44) leading from the equalizing reservoir and which is closed by an actuating motor (43);
   d. a selector valve (47) normally connecting the piloted motor (46) of the cutout valve (18) with the main reservoir (12) and shiftable to a position in which it connects the piloted motor with the atmosphere by an actuating motor (48); and
   e. actuating means, including an actuating motor (52), for operating the vent valve (19), the actuating motor being arranged to effect opening of the vent valve.

2. The improvement defined in claim 1 in which the actuating means for the vent valve comprises:

a. a pair of opposed air motors (19b, 19c) for shifting the valve (19) in opening and closing directions, the first air motor (19b) being subject to brake pipe pressure and urging the valve in the opening direction; and
   b. a second selector valve (51) normally connecting the second air motor (19c) with the brake pipe (11) and shiftable by said actuating motor (52) to a position in which it connects the second air motor with the atmosphere.

3. The improvement defined in claim 1 in which the actuating motors (25, 26, 27, 41, 43, 48, 52) are air-operated motors.

4. The improvement defined in claim 1 in which the actuating motors (25, 26, 27) associated with the regulating valve (21) change the output pressure of that valve different amounts.

5. The improvement defined in claim 4 in which:
   a. there are three actuating motors (25, 26, 27) associated with the regulating valve (21); and
   b. the changes in the output pressure of the regulating valve produced by said three actuating motors are in the ratio of 1: 2: 4.

6. The improvement defined in claim 1 which includes control means (25b, 26b, 27b, 41b, 43b, 48b, 52b, 53, 54) for the actuating motors which affords at least:
   a. a release condition (R) in which it energizes all of the actuating motors except the one (52) associated with the vent valve (19);
   b. a full service application condition (S8) in which it energizes only the actuating motors (43, 48) associated with the discharge valve (17) and the selector valve (47);
   c. a partial service application condition (s1—S7) in which it energizes only the actuating motors (43, 48) associated with the discharge valve (17) and the selector valve (47) and at least one of the actuating motors (25, 26, 27) associated with the resulting valve (21); and
   d. an emergency condition (E) in which it energizes only the actuating motors (48, 52) associated with the selector valve (47) and the vent valve (19).

7. The improvement defined in claim 6 in which the control means also affords an off condition (HO) in which it energizes only the actuating motor (48) associated with the selector valve (47).

8. The improvement defined in claim 7 in which the control means affords several partial service application conditions in each of which it energizes both of the actuating motors (43, 48) associated with the discharge valve (17) and the selector valve (47) and different ones or groups of said actuating motors (25, 26, 27) associated with the regulating valve (21).

9. The improvement defined in claim 2 in which:
   a. the actuating motors (25, 26, 27, 41, 43, 48, 52) are air-operated motors; and
   b. there are three actuating motors (25—27) associated with the regulating valve (21), and these motors are effective to change the output pressure of the regulating valve different amounts.

10. The improvement defined in claim 9 which includes control means for the actuating motors which affords:
    a. a release condition (R) in which it vents the actuating motor (52) associated with the second selector valve (51) while pressurizing all of the other actuating motors (25, 26, 27, 41, 43, 48);
    b. a full service application condition (S8) in which it pressurizes the actuating motors (43, 48) associated with the discharge valve (17) and the first selector valve (47) while venting all of the other actuating motors (25, 26, 27, 41, 52);
    c. seven partial service application conditions (S1—S7) in each of which it pressurizes the actuating motors (43, 48) associated with the discharge valve (17) and the first selector valve (47) and a different one or group of the actuating motors (25—27) associated with the regulating valve (21) while venting the other actuating motors;
d. an emergency condition (E) in which it pressurizes the actuating motors (48, 52) associated with the selector valves while venting the other actuating motors (25, 26, 27, 41, 43); and
e. an off condition (HO) in which it pressurizes the actuating motor (48) associated with the first selector valve (47) while venting all of the other actuating motors (25, 26, 27, 41, 43, 52).

11. The improvement defined in claim 10 in which the changes in the output pressure of the regulating valve (21) produced by the individual action of the associated actuating motors (25—27) are in the ratio of 1: 2: 4.